United States Patent
Naravanamurthy

(10) Patent No.: US 7,893,863 B2
(45) Date of Patent: Feb. 22, 2011

(54) ENHANCED AIRCRAFT TRANSPONDER RELIABILITY

(75) Inventor: Guruprasad Naravanamurthy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 101 days.

(21) Appl. No.: 12/350,107

(22) Filed: Jan. 7, 2009

(65) Prior Publication Data
US 2010/0171647 A1  Jul. 8, 2010

(51) Int. Cl.
G01S 13/08 (2006.01)
(52) U.S. Cl. .............................. 342/51; 342/37; 342/42
(58) Field of Classification Search .................. 342/37, 342/42, 51
See application file for complete search history.

(56) References Cited

U.S. PATENT DOCUMENTS

| 6,766,250 | B2 | 7/2004 | Ybarra et al. |
| 2004/0174295 | A1* | 9/2004 | Stayton et al. ............... 342/182 |
| 2005/0151025 | A1 | 7/2005 | Mendelson et al. |
| 2005/0156777 | A1* | 7/2005 | King et al. ..................... 342/29 |
| 2005/0200501 | A1* | 9/2005 | Smith .......................... 340/963 |
| 2006/0025900 | A1* | 2/2006 | Arnouse ........................ 701/10 |

* cited by examiner

Primary Examiner—Thomas H Tarcza
Assistant Examiner—Timothy A Brainard
(74) Attorney, Agent, or Firm—Black Lowe & Graham PLLC

(57) ABSTRACT

An aircraft system includes a transponder and a processor. The processor is configured to determine if the aircraft is positioned in a predetermined restricted flying zone. If the aircraft is positioned in a predetermined restricted flying zone, the processor determines if the transponder is functioning in a transmit mode. If the transponder is not functioning in a transmit mode, the processor sets the transponder to function in a transmit mode.

15 Claims, 2 Drawing Sheets

ENHANCED AIRCRAFT TRANSPONDER RELIABILITY

BACKGROUND OF THE INVENTION

There are hundreds of restricted airspace regions and flying zones all over the world. Some examples include the White House in the U.S., the Rashtrapathi Bhavan in India, and various military installations.

Restricted areas cover regions within which the flight of aircraft, while not wholly prohibited, is subject to restrictions. Restricted areas typically include hazards to aircraft such as artillery firing, aerial gunnery, or guided missiles. As such, penetration by the aircraft of restricted areas without authorization may be extremely hazardous to the aircraft and its occupants.

Hundreds of pilots inadvertently enter restricted airspace every year without any destructive intent. In many such cases, the plane may be gunned down or buildings within the restricted area may require unnecessary evacuation. In addition, if the plane is hijacked and is flown into a restricted area with the identifying transponder switched off, communication from the plane to air traffic control may be disabled.

SUMMARY OF THE INVENTION

In an embodiment, an aircraft system includes a transponder and a processor. The processor is configured to determine if the aircraft is positioned in a predetermined restricted flying zone. If the aircraft is positioned in a predetermined restricted flying zone, the processor determines if the transponder is functioning in a transmit mode. If the transponder is not functioning in a transmit mode, the processor sets the transponder to function in a transmit mode.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
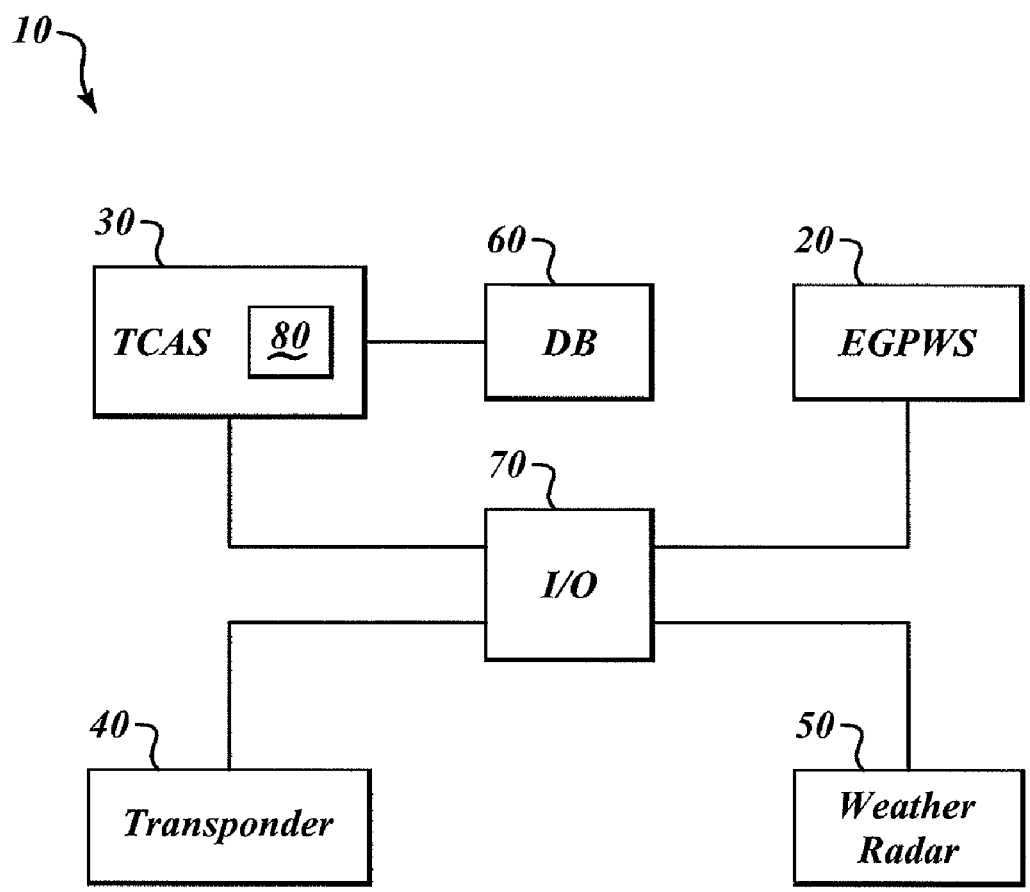
FIG. 1 illustrates an operating environment in which principles of the present invention can be implemented.

FIG. 1 illustrates an example of a suitable operating environment that can be implemented as a system onboard an aircraft (not shown), and in which an embodiment of the invention may be implemented. The operating environment is only one example of a suitable operating environment and is not intended to suggest any limitation as to the scope of use or functionality of the invention.

Embodiments of the invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The operating environment illustrated in FIG. 1 typically includes at least some form of computer readable media. Computer readable media can be any available media that can be accessed by one or more components of such operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by one or more components of such operating environment. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Referring to FIG. 1, a system 10, such as an Integrated Surveillance Unit (ISU) according to an embodiment of the invention, includes an EGPWS (Enhanced Ground Proximity Warning System) 20, a TCAS (Traffic Collision Avoidance System) 30, a transponder (XPDR) 40, a weather radar system 50, an airspace/terrain database 60, and an input/output module (TOM) 70. In various embodiments, the system 10 may include components additional to or exclude some of the components illustrated in FIG. 1. Additionally, in an embodiment, the aircraft may include two or more such systems 10 for purposes of redundancy.

The IOM 70 serves as an interface for the other components illustrated in FIG. 1, and may be coupled to such components via ethernet links, for example. Alternatively, a conventional system bus (not shown) may be substituted for the IOM 70.

In an embodiment, the TCAS 30 and transponder 40 reside in a single card, the weather radar system 50 and EGPWS 20 in another card and the IOM 70 in a third card.

The TCAS 30 includes a processor, such as a computing unit (CU) 80 communicatively coupled to the other components of system 10. Alternatively, the CU 80 is a processing device separate and apart from the TCAS 30. In an embodiment of the invention, the transponder 40 includes a Mode S transponder. TCAS CU 80 performs collision avoidance functions including, among other things, airspace surveillance, intruder tracking, aircraft altitude tracking, threat detection, RA maneuver determination and selection, advisory generation, and flight formation detection. Collision avoidance functions are performed in normal modes of operation and in a quiet mode of operation. TCAS CU 80 determines a suitable mode of operation and notifies transponder 40 of operation in a quiet mode. The TCAS CU 80 may perform its tasks using pressure altitude, radar altitude, and transponder replies/responses from other aircraft to interrogations. TCAS CU 80 may use antennas (not shown) to transmit interrogations and to receive transponder replies to the interrogations. In various normal modes of operation, system 10 responds to interrogations and transmits unsolicited messages according to known performance specifications. In a quiet or standby mode of operation, system 10 does not (as it would in a normal mode) respond to particular interrogation message formats or transmit particular unsolicited message formats.

Transponder 40 responds to interrogations received from other aircraft as well as from air traffic control (ATC). The responses may include an aircraft identification number or flight ID assigned by ATC as well as pressure altitude from an onboard altimeter (not shown) if the transponder 40 is a mode S transponder. Transponder 40 enters and exits a quiet mode upon receipt of suitable commands from the TCAS CU 80 (e.g., enters quiet mode during military formation flight). During quiet mode, transponder 40 may only respond to interrogations received from other aircraft and ignores ATC interrogations.

A conventional EGPWS includes a terrain database, which may be in the form of a matrix of coordinates required for terrain alert calculations, based on which alerts are issued. In an embodiment of the invention, the database 60 includes a restricted airspace database that includes the coordinates that define the boundaries of restricted flying zones, as may be defined in NOTAM or a similar source. This restricted area information can be loaded along with the conventional terrain information to implement database 60. As such, the TCAS 30 in conjunction with the database 60 can define an imaginary "wall" along a restricted airspace zone, similar to a terrain clearance floor constructed while avoiding terrain. As soon as the aircraft moves to within a predetermined threshold distance from this wall, a warning may be issued to the flight crew. Further, if the aircraft moves into the restricted airspace, then measures may be taken by the TCAS 30 with respect to the transponder 40 for handling the possible scenarios of the pilot unintentionally entering the airspace or aircraft hijacking, as described in greater detail below.

Figure 2:
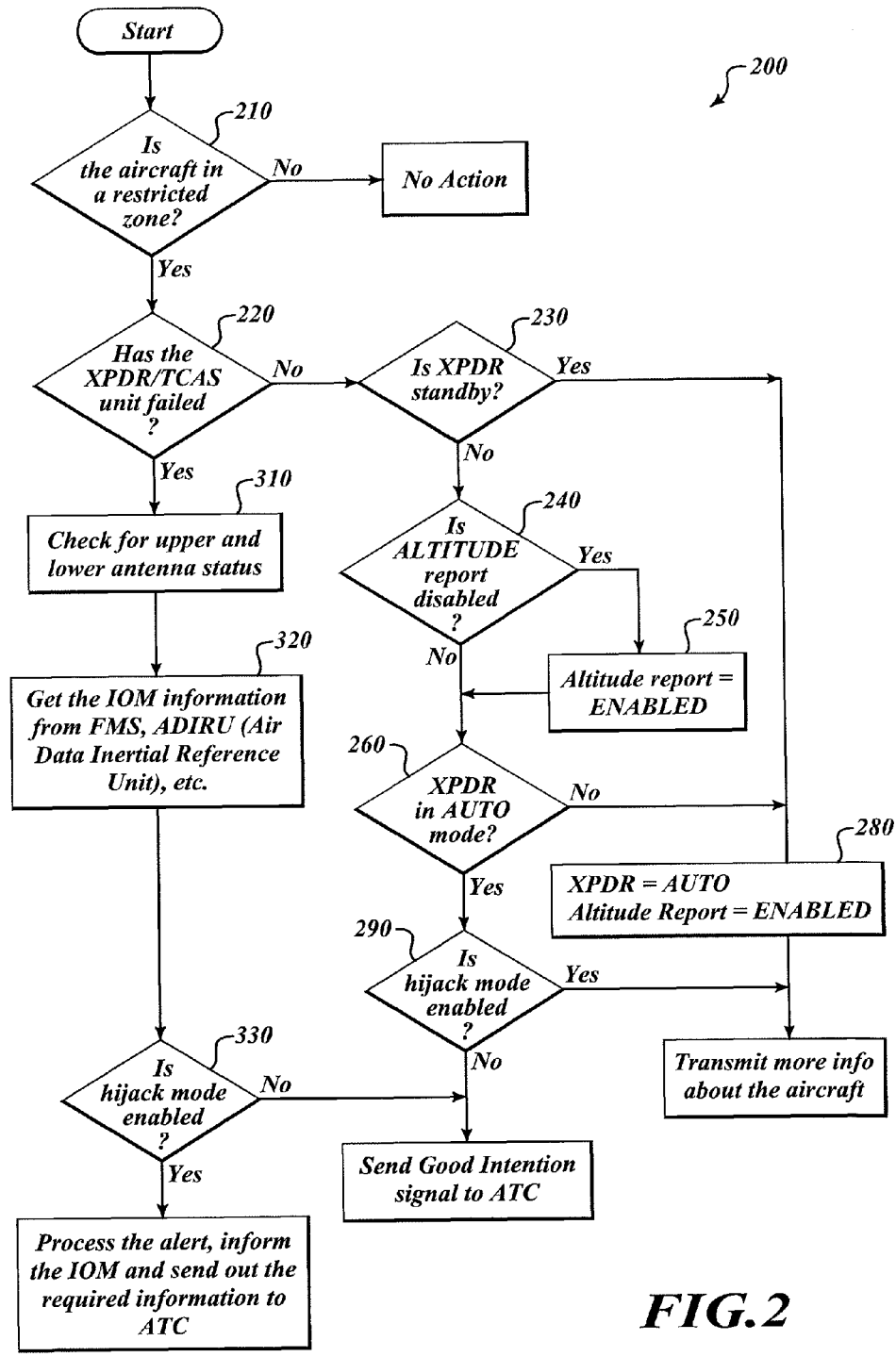
FIG. 2 illustrates a flowchart of a process in accordance with an embodiment of the present invention.

FIG. 2 illustrates a process 200 according to an embodiment of the invention. The process 200 is illustrated as a set of operations shown as discrete blocks. The process 200 may be implemented in any suitable hardware, software, firmware, or combination thereof. The order in which the operations are described is not to be necessarily construed as a limitation.

At a block 210, CU 80, in consultation with database 60, determines whether the aircraft has entered a restricted flying zone. If not, no present action is taken, and the CU 80 repeats the query of block 210 at a predetermined future time. If the restricted zone has been entered, then, at a block 220, CU 80 determines whether the transponder/TCAS card has failed. If no such failure has occurred, then, at a block 230, CU 80 determines whether the transponder 40 is in a standby or quiet mode.

If the transponder 40 is not in standby mode, then, at a block 240, CU 80 determines whether altitude reporting by the transponder 40 is disabled. If altitude reporting is disabled, then, at a block 250, CU 80 enables altitude reporting. If altitude reporting has not been disabled (or after altitude reporting has been enabled), then, at a block 260, CU 80 determines whether the transponder 40 is in "Auto" mode such that the transponder is enabled to transmit an identification of the aircraft. If the transponder 40 is in standby mode in the restricted zone, then the CU 80, at a block 270, sets the transponder to Auto mode and enables the altitude reporting functionality if not already achieved.

In an embodiment, at the time the transponder 40 is set to Auto mode, and/or at such time as it has been determined by CU 80 that the aircraft has entered a restricted zone, the CU 80 disables standby/quiet mode of the transponder 40, such that the transponder is not allowed to enter standby mode while the aircraft is in the restricted zone.

At a block 290, CU 80 determines whether a hijack mode of the transponder has been enabled. In an embodiment, the hijack mode is enabled when the CU 80 determines that a member of the flight crew has attempted to cause the transponder 40 to enter standby mode while the aircraft is in a restricted zone. If hijack mode is enabled, then the transponder 40 or other communication device aboard the aircraft communicates this fact to ATC. Otherwise, subsequently, a message of harmless or good intention may be transmitted by the transponder 40 to ATC.

Returning to block 220, if the transponder/TCAS card has failed, then, at a block 310, the CU 80 may check other communication systems, such as antennae associated with the transponder 40, to determine possible causes for the failure. Subsequently, or contemporaneously, the CU 80, at a block 320, functions to retrieve, via the IOM 70, information aircraft identification and/or altitude information from other sub-systems of the aircraft, such as the Flight Management System (FMS) and/or Air Data Inertial Reference Unit (ADIRU), for transmission to ATC.

At a block 330, if the CU 80 determines that the failure may be the result of the transponder/TCAS being disabled by a flight crew member, a hijack mode alert, as described above, may be transmitted to ATC.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A computer-readable medium including instructions that, when executed by a processor onboard an aircraft having a transponder, enable the processor to perform steps comprising:
   determining if the aircraft is positioned in a predetermined restricted flying zone;
   if the aircraft is positioned in a predetermined restricted flying zone, determining if the transponder is functioning in a transmit mode; and
   if the transponder is not functioning in a transmit mode, setting the transponder to function in a transmit mode.

2. The medium of claim 1 wherein the transponder has an altitude-report mode, and the steps further comprise:
   if the aircraft is positioned in a predetermined restricted flying zone, determining if the transponder is functioning in the altitude-report mode; and
   if the transponder is not functioning in the altitude-report mode, setting the transponder to function in the altitude-report mode.

3. The medium of claim 1 wherein the steps further comprise:
   if the aircraft is positioned in a predetermined restricted flying zone, determining if the transponder is malfunctioning.

4. The medium of claim 1 wherein determining if the aircraft is positioned in a predetermined restricted flying zone comprises consulting a terrain database onboard the aircraft.

5. The medium of claim 1 wherein the transponder is configured to function in a non-transmit mode, and the steps further comprise:
   if the aircraft is positioned in a predetermined restricted flying zone, disabling the non-transmit mode.

6. A computer-readable medium including instructions that, when executed by a processor onboard an aircraft having a transponder configured to function in a non-transmit mode, enable the processor to perform steps comprising:
   determining if the aircraft is positioned in a predetermined restricted flying zone; and
   if the aircraft is positioned in a predetermined restricted flying zone, disabling the non-transmit mode.

7. The medium of claim 6 wherein the steps further comprise:
   if the aircraft is positioned in a predetermined restricted flying zone, determining if the transponder is functioning in a transmit mode; and
   if the transponder is not functioning in a transmit mode, setting the transponder to function in a transmit mode.

8. The medium of claim 6 wherein the transponder has an altitude-report mode, and the steps further comprise:
   if the aircraft is positioned in a predetermined restricted flying zone, determining if the transponder is functioning in the altitude-report mode; and
   if the transponder is not functioning in the altitude-report mode, setting the transponder to function in the altitude-report mode.

9. The medium of claim 6 wherein the steps further comprise:
   if the aircraft is positioned in a predetermined restricted flying zone, determining if the transponder is malfunctioning.

10. The medium of claim 6 wherein determining if the aircraft is positioned in a predetermined restricted flying zone comprises consulting a terrain database onboard the aircraft.

11. An aircraft system comprising:
   a transponder; and
   a processor coupled to the transponder, the processor configured to:
   determine if the aircraft is positioned in a predetermined restricted flying zone,
   if the aircraft is positioned in a predetermined restricted flying zone, determine if the transponder is functioning in a transmit mode, and
   if the transponder is not functioning in a transmit mode, set the transponder to function in a transmit mode.

12. The system of claim 11 wherein the transponder has an altitude-report mode, and the processor is further configured to:
   if the aircraft is positioned in a predetermined restricted flying zone, determine if the transponder is functioning in the altitude-report mode; and
   if the transponder is not functioning in the altitude-report mode, set the transponder to function in the altitude-report mode.

13. The system of claim 11 wherein the processor is further configured to:
   if the aircraft is positioned in a predetermined restricted flying zone, determine if the transponder is malfunctioning.

14. The system of claim 11, further comprising a terrain database, and wherein determining if the aircraft is positioned in a predetermined restricted flying zone comprises consulting the terrain database.

15. The system of claim 11 wherein the transponder is configured to function in a non-transmit mode, and the processor is further configured to:
   if the aircraft is positioned in a predetermined restricted flying zone, disable the non-transmit mode.

* * * * *

UNITED STATES PATENT AND TRADEMARK OFFICE
CERTIFICATE OF CORRECTION

| | | |
|---|---|---|
| PATENT NO. | : 7,893,863 B2 | Page 1 of 1 |
| APPLICATION NO. | : 12/350107 | |
| DATED | : February 22, 2011 | |
| INVENTOR(S) | : Guruprasad Narayanamurthy | |

It is certified that error appears in the above-identified patent and that said Letters Patent is hereby corrected as shown below:

On the title page, item (75) the inventor's name is spelled incorrectly. It should read as follows:

--Guruprasad Narayanamurthy--

Signed and Sealed this
Fifth Day of April, 2011

David J. Kappos
*Director of the United States Patent and Trademark Office*